Figure 1:
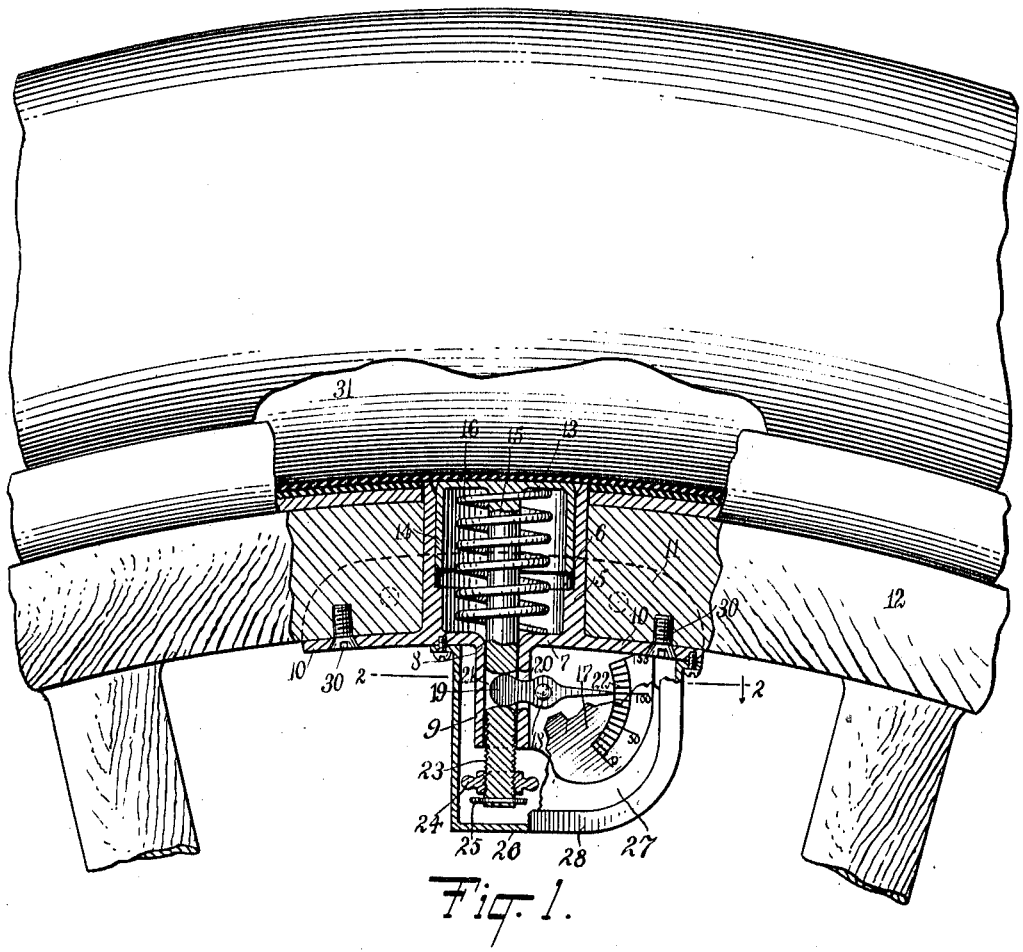

A. J. DE LOTBINIÈRE.
TIRE INFLATION INDICATOR.
APPLICATION FILED MAR. 22, 1911.

1,019,674.

Patented Mar. 5, 1912.

WITNESSES
George Bambay.
P. B. Marshall

INVENTOR
Hlair J. de Lotbinière
BY
ATTORNEYS

UNITED STATES PATENT OFFICE.

ALAIR JOLY DE LOTBINIÈRE, OF SRINAGAR, INDIA.

TIRE-INFLATION INDICATOR.

1,019,674.   Specification of Letters Patent.   Patented Mar. 5, 1912.

Application filed March 22, 1911. Serial No. 616,112.

*To all whom it may concern:*

Be it known that I, ALAIR J. DE LOTBINIÈRE, a major in the British Army, stationed at Srinagar, Kashmir, British India, have invented a new and Improved Tire-Inflation Indicator, of which the following is a full, clear, and exact description.

My invention relates to tire inflation indicators, and it has for its object to provide one having a piston disposed against the inner tube of the tire, and adapted to be pressed outwardly by the pressure of the air in the inner tube, and against the pressure of the spring, an indicator being provided which is operable by the piston.

Another object of my invention is to provide means for limiting the movement of the piston in each direction.

Additional objects of the invention will appear in the following complete specification, in which the preferred form of my invention is disclosed.

In the drawings similar characters of reference indicate corresponding parts in both the views, in which—

Figure 2:
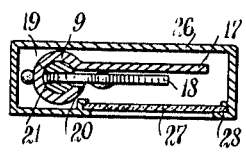

Figure 1 is a fragmentary view, partially in section, showing how my indicator is adjusted and is secured to the felly of a wheel; and Fig. 2 is a sectional view on the line 2—2 of Fig. 1.

By referring to the drawings it will be seen that a cylinder 5 is provided having inner shoulders 6, the cylinder 5 having a head 7, with an opening 8, a sleeve 9, which is integral with the head 7, extending from the said opening 8. Flanges 10 extend from the head 7, these flanges 10 having upset portions 11, which are disposed against the sides of the felly 12. In the cylinder 5 there is disposed a piston 13, having side extensions 14, which are adapted to abut against the inner shoulders 6 of the cylinder 5. A piston rod 15 is secured to the piston 13, the piston rod projecting through the sleeve 9. A spring 16 is coiled around the piston rod 15, between the piston 13 and the head 7, the function of this spring being to hold the piston 13 yieldingly extended from the head 7. A plate 17 is provided, which is integral with the sleeve 9, and with the flanges 10, a hand or pointer 18 being pivoted to this plate 17. The rear portion 19 of the hand or pointer 18 projects through an opening 20 in the sleeve 9, this portion 19 of the hand or pointer 18 being also disposed in an opening 21 in the piston rod 15. It will therefore be seen that as the piston rod 15 is moved in the sleeve 9, it will cause the hand or pointer 18 to rotate on its pivot, and to coöperate with the scale 22 on the plate 17 to indicate the position of the piston 13 in the cylinder 5. The inner terminal of the piston rod 15 is threaded at 23 and it is engaged by a wing nut 24 which may be turned against the end of the sleeve 9 and be used to draw down the piston rod 15 and the piston 13 to permit of the removal of the outer tire. A pin 25 is disposed in an opening in the piston rod, to prevent the disengagement of the wing nut. A casing 26 is provided for inclosing the sleeve 9, the projecting portion of the piston rod 15, the hand 18, and the scale 22, a glass or transparent member 27 being inserted in a cut-away portion 28 of the casing 26, so that the position of the hand 18 relatively to the scale 22 may be readily determined.

In using the indicator the cylinder 5 is mounted in the felly 12 in the manner shown in the drawings, with the flanges 10 resting against the inner side of the felly, and the upset portions 11 of the flanges 10 resting against the sides of the felly. These flanges 10 are secured to the felly by means of the screws 30. As the cylinder 5 projects completely through the felly 12 the piston 13 rests against the inner tube 31 of the tire, and before the inner tube 31 is inflated, the piston 13 is forced by means of the spring 16, outwardly, and into the tire. However, when the inner tube 31 is inflated the compressed air in the said inner tube forces the piston inwardly, until its side portions 14 abut against the inner shoulders 6 of the cylinder 5. It will therefore be seen that the movement of the piston 13 by means of the compressed air in the inner tube 31 is limited, and that the side portions 14 of the said piston 13 will rest against the shoulder 6, and prevent any further sinking of the piston. As the piston 13 is forced inwardly against the pressure of the spring 16, by means of the inflation of the inner tube 31, the piston rod 15 is pushed through the sleeve 9, thereby operating the rear portion 19 of the pointer or finger 18, and causing the said finger or pointer to coöperate with the scale 22 to indicate the position of the piston 13 relatively to the cylinder 5.

In the drawings it will be seen that the device is adjusted so that the finger or pointer will register with the scale 22 at the "100" mark, when the inner tube 31 has been inflated, and the surface of the piston is flush with the felly of the tire; but it will, of course, be understood that there may be any other arrangement or adjustment of the members described above, which will accomplish the desired result.

The inward movement of the piston 13 is limited by the shoulders 6, and the outward movement of the piston is limited by the engagement of the wing nut 24 with the end of the sleeve 9.

Having thus described my invention, I claim as new and desire to secure by Letters Patent:

1. In a tire inflation indicator a cylinder having a sleeve with an opening, a piston disposed in the cylinder and adapted to engage a pneumatic tire, a spring for holding the piston yieldingly in a predetermined position relatively to the cylinder, a piston rod having a threaded portion and secured to the piston and normally disposed with its threaded portion partially within and partially without the sleeve, a scale, a finger disposed through the opening in the sleeve, operable by the piston rod and coöperating with the scale to indicate the position of the piston relatively to the cylinder, and a nut engaging the thread on the piston rod, adapted to abut against the end of the sleeve for drawing the piston rod and the piston against the tension of the spring.

2. In a tire inflation indicator a cylinder having an inner shoulder between its ends, an outer flange at one end of the cylinder, a head with an opening secured to the said end of the cylinder, a sleeve secured to the head and registering with the opening, the sleeve having a lateral opening, a piston disposed in the cylinder adapted to abut against the shoulder, a piston rod having a recess secured to the piston and disposed in the sleeve, a spring disposed between the piston and the head, a scale, and a finger extending through the opening in the sleeve, and projecting in the recess in the piston rod for coöperating with the scale for indicating position of the piston in the cylinder.

3. In a tire inflation indicator a cylinder having at one end a head with an opening and a sleeve with a lateral opening in communication with the opening in the head, substantially parallel flanges connected with the head and adapted to be disposed against opposite sides of a rim, a piston disposed in the cylinder, a spring for holding the piston yieldingly in a predetermined position relatively to the cylinder, a piston rod secured to the piston and disposed in the sleeve, a scale, and a finger extending through the opening in the sleeve and operable by the piston rod for coöperating with the scale for indicating the position of the piston in the cylinder.

4. In a tire inflation indicator a cylinder having an inner shoulder between its ends, flanges connected with the cylinder and adapted to engage a rim of a wheel, a sleeve secured to the cylinder and provided with a lateral opening, a piston disposed in the cylinder adapted to abut against the shoulder for limiting the movement of the piston in one direction, relatively to the cylinder, a piston rod having a threaded portion partially disposed within the sleeve and partially without the sleeve, there being a recess in the piston rod, resilient means for holding the piston yieldingly in a predetermined position relatively to the cylinder, a scale, a finger extending through the opening in the sleeve and projecting in the recess in the piston rod for coöperating with the scale for indicating the position of the piston in the cylinder, and a nut meshing with the thread on the piston rod adapted to abut against the end of the sleeve for drawing the piston rod and the piston against the tension of the spring.

In testimony whereof I have signed my name to this specification in the presence of two subscribing witnesses.

ALAIR JOLY de LOTBINIÈRE.

Witnesses:
NALINAKSHA BANERJEE,
SHIVA RAM.